(12) United States Patent
Jakubowski et al.

(10) Patent No.: US 9,832,968 B2
(45) Date of Patent: Dec. 5, 2017

(54) FOLDABLE PET STEPS

(71) Applicant: Vermont Juvenile Furniture Mfg., Inc., West Rutland, VT (US)

(72) Inventors: Chris Jakubowski, Rutland, VT (US); Rich Wu, Taichung (TW)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 93 days.

(21) Appl. No.: 14/636,760

(22) Filed: Mar. 3, 2015

(65) Prior Publication Data

US 2016/0255802 A1 Sep. 8, 2016

(51) Int. Cl.
*A01K 1/035* (2006.01)

(52) U.S. Cl.
CPC .................. *A01K 1/035* (2013.01)

(58) Field of Classification Search
CPC ......... A01K 1/035; A01K 29/00; E04F 11/04; E04F 11/06; E04F 11/062; E04F 11/066; E04F 11/068; B60R 3/02
USPC .......... 119/712, 753, 843; 52/182, 183, 188; 297/232, 236, 239, 240; 182/152
See application file for complete search history.

(56) References Cited

U.S. PATENT DOCUMENTS

| | | | |
|---|---|---|---|
| 600,281 A * | 3/1898 | Garland | E06C 1/54 108/100 |
| 1,280,797 A * | 10/1918 | Michenfelder | A47C 12/02 182/28 |
| 3,093,209 A * | 6/1963 | Nagy | E06C 1/39 182/118 |
| 3,446,311 A * | 5/1969 | Alfie | E06C 1/387 182/116 |
| 3,884,160 A * | 5/1975 | Gutierrez | A47B 3/087 108/169 |
| 4,630,861 A * | 12/1986 | Henschel | A47C 4/08 108/124 |
| 5,368,126 A * | 11/1994 | Woodward | E04G 1/34 182/118 |
| D382,676 S | 8/1997 | Holbrook | |
| 5,870,788 A | 2/1999 | Witkin | |
| 6,119,634 A | 9/2000 | Myrick | |
| 6,267,082 B1 | 7/2001 | Naragon et al. | |
| 6,430,769 B1 | 8/2002 | Allen | |
| 6,928,959 B1 | 8/2005 | Trauernicht et al. | |
| 7,237,294 B2 | 7/2007 | Lensing | |
| D579,680 S * | 11/2008 | Emert | D6/353 |
| 7,526,826 B2 | 5/2009 | Bailie | |
| 7,621,236 B2 | 11/2009 | Steffey et al. | |
| 7,766,357 B2 | 8/2010 | Arvanites | |
| 8,091,294 B2 | 1/2012 | Whalen | |
| 8,104,578 B2 | 1/2012 | Moldthan et al. | |
| 8,272,477 B1 | 9/2012 | Hudspeth et al. | |
| 8,359,691 B2 | 1/2013 | Morris et al. | |

(Continued)

*Primary Examiner* — Lisa L Tsang
(74) *Attorney, Agent, or Firm* — Volpe and Koenig, P.C.

(57) ABSTRACT

A foldable step apparatus having an upper tread with a first end and a second end, a first support pivotably joined to the first end at a first joint and a second support pivotably joined to the second end at a second joint. A lower tread has a third end and a fourth end, the third end pivotably joined to the second support at a third joint and a third support pivotably joined to the fourth end at a fourth joint. The lower tread has a first portion and a second portion pivotably joined at a fifth joint between the third end and the fourth end of the lower tread.

10 Claims, 17 Drawing Sheets

(56) References Cited

U.S. PATENT DOCUMENTS

| | | |
|---|---|---|
| 8,453,795 B2 | 6/2013 | Lee et al. |
| 8,899,188 B1 | 12/2014 | Douglas et al. |
| 2005/0056233 A1* | 3/2005 | O'Leary .............. A01K 1/035 119/753 |
| 2006/0150346 A1 | 7/2006 | Myrick et al. |
| 2009/0188444 A1* | 7/2009 | Whalen .............. A01K 1/035 119/849 |
| 2009/0189365 A1* | 7/2009 | Ferguson ............ B60R 3/02 280/166 |
| 2010/0187041 A1* | 7/2010 | Crouch ............. A47D 15/003 182/223 |
| 2011/0067608 A1* | 3/2011 | Eveleth .............. A47B 3/08 108/115 |
| 2011/0114419 A1* | 5/2011 | Merey ............... E06C 1/383 182/152 |
| 2013/0154230 A1* | 6/2013 | Ziaylek et al. ....... B60R 3/02 280/166 |
| 2014/0123910 A1 | 5/2014 | Rorke et al. |

* cited by examiner

FOLDABLE PET STEPS

FIELD OF INVENTION

Embodiments of the present disclosure generally relate to devices which assist pets, such as dogs, in ascending to, and descending from, elevated surfaces under their own power without the need for jumping or being lifted, and more particularly to a foldable step device for use by pets

BACKGROUND

Ramps and step devices are used to assist pets who, because of age, size, infirmity, injury, or the like cannot reach an elevated surface without assistance. Elevated surfaces may include automotive interior spaces or pickup truck beds, household furniture, or tables for grooming or veterinary care.

Some current step apparatuses are solid structures which cannot be folded for transport or storage. Other current ramp and step apparatuses may be foldable but present a bulky and heavy folded package.

Accordingly, a need exists for an improved step apparatus for pets that is lightweight and collapsible into a compact folded size.

SUMMARY

Embodiments of a foldable pet steps are provided herein. In some embodiments, a foldable step apparatus comprises an upper tread with a first end and a second end. A first support is pivotably joined to the first end at a first joint and a second support is pivotably joined to the second end at a second joint. The apparatus further includes a lower tread having a third end and a fourth end, the third end is pivotably joined to the second support at a third joint and a third support is pivotably joined to the fourth end at a fourth joint. The lower tread comprises a first portion and a second portion pivotably joined at a fifth joint between the third end and the fourth end. This arrangement allows for compact folding of the pet steps due to the lower tread being foldable about the fifth joint Other and further embodiments of the present invention are described below.

BRIEF DESCRIPTION OF THE DRAWINGS

Embodiments of the present apparatus, briefly summarized above and discussed in greater detail below, can be understood by reference to the illustrative embodiments depicted in the appended drawings. It is to be noted, however, that the appended drawings illustrate only typical embodiments and are therefore not to be considered limiting of its scope, for the disclosure may admit to other equally effective embodiments.

Figure 1:
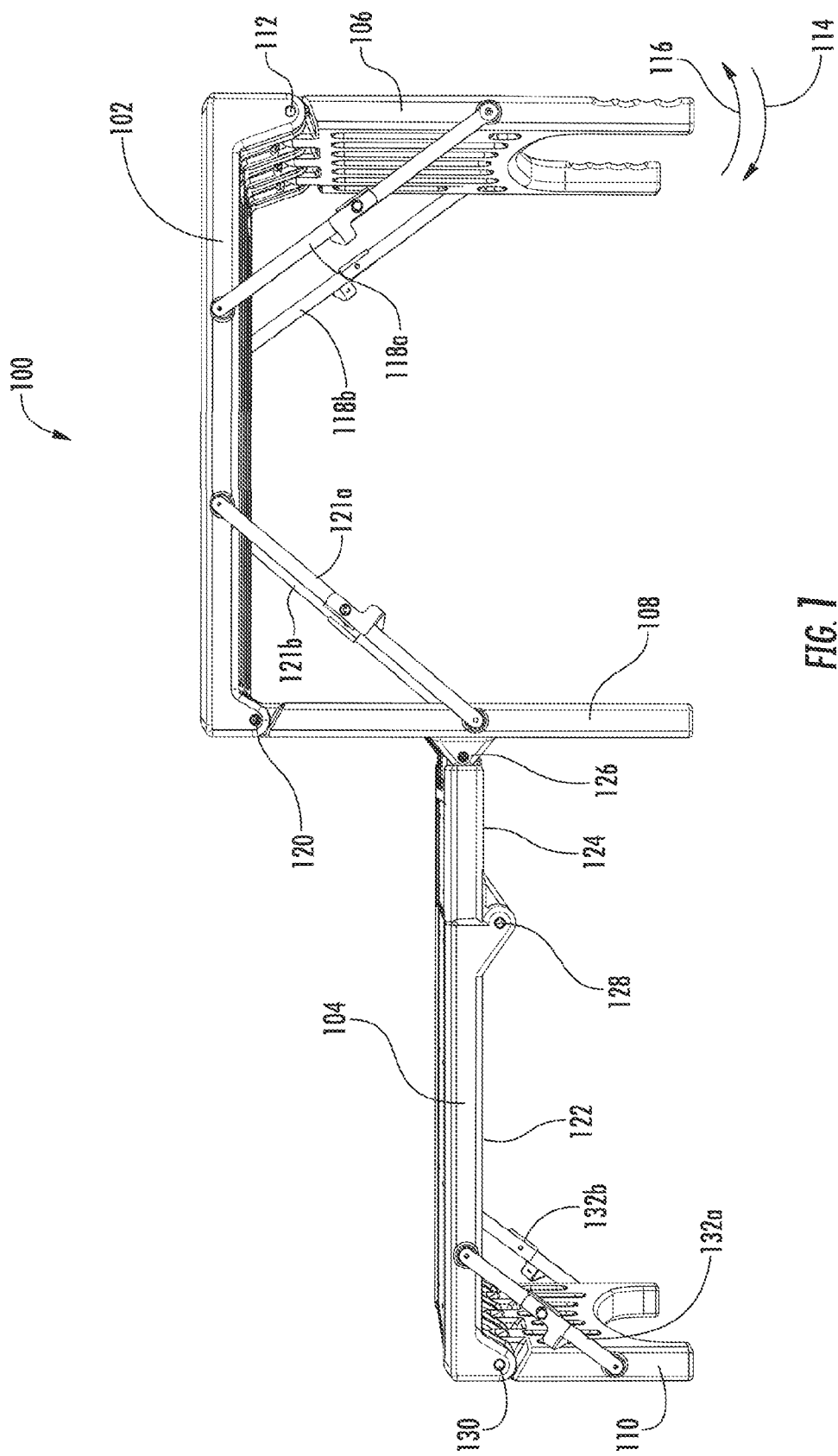
FIG. 1 is a side view of a folding pet step apparatus according to an embodiment of the disclosure in an un-folded configuration.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to folding steps for pets, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "front," "rear," "top," "bottom," "upper," and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 depicts a non-limiting embodiment of a foldable step apparatus 100 in an un-folded state, ready for use. As illustrate, the apparatus 100 comprises two generally planar and parallel platform steps, upper tread 102 and lower tread 104, and first support 106, second support 108, and third support 110. The first, second, and third supports 106, 108, 110, provide support to the upper and lower treads 102, 104 and are configured to rest upon a generally horizontal supporting surface. In an embodiment, at least some of the components parts (e.g., upper tread 102, lower tread 104, first support 106, second support 108, and the third support 110) of the apparatus 100 are formed as hollow polymeric parts from a thermoplastic or thermoset resin in a molding operation (e.g., blow molding, rotational molding, or injection molding). The component parts may also be formed in a solid resin or may be formed from, or filled with, an open- or closed-cell foamed plastic.

Figure 2:
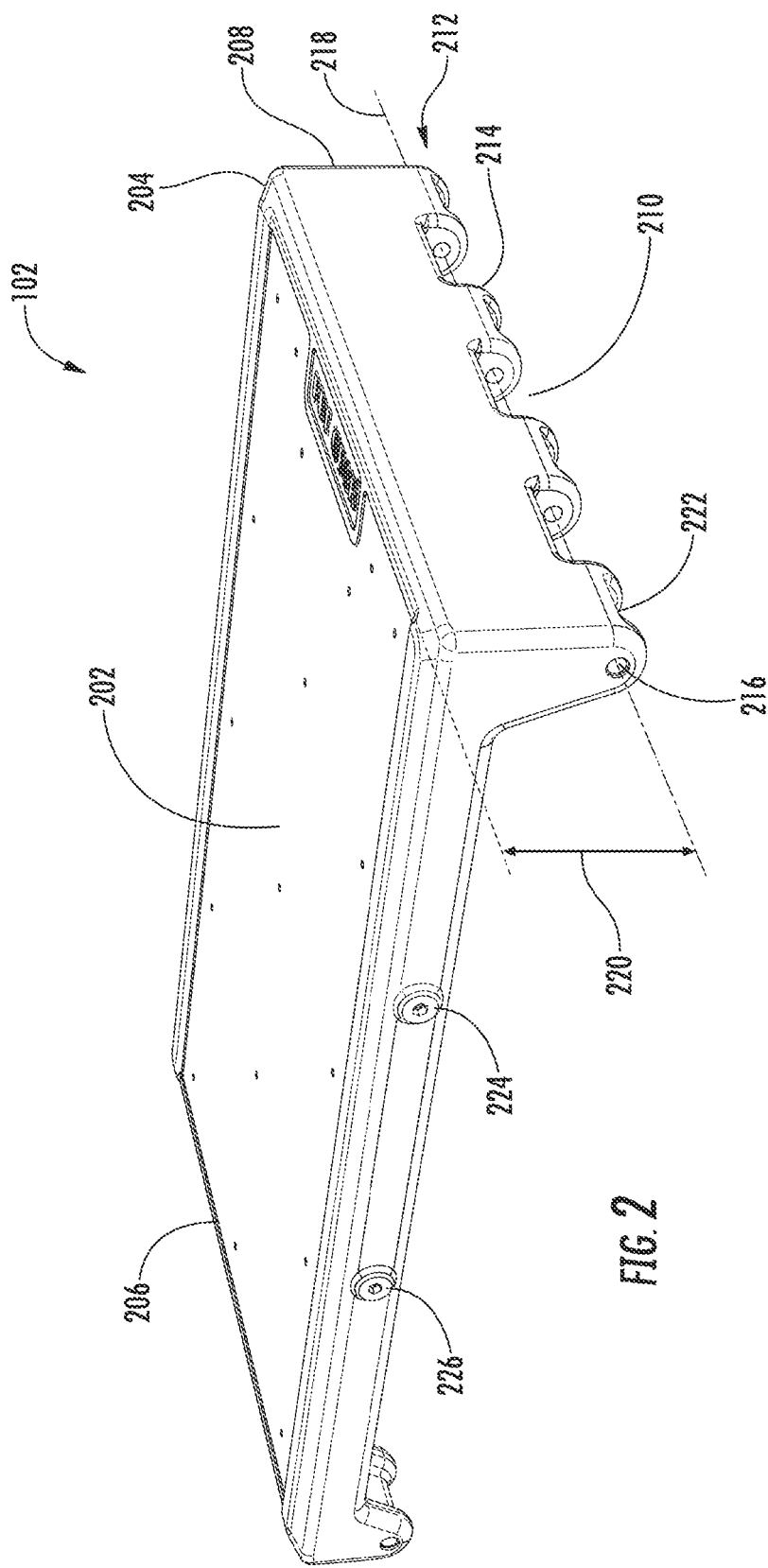
FIG. 2 is a top perspective view of an upper tread of the apparatus of FIG. 1.
Figure 3:
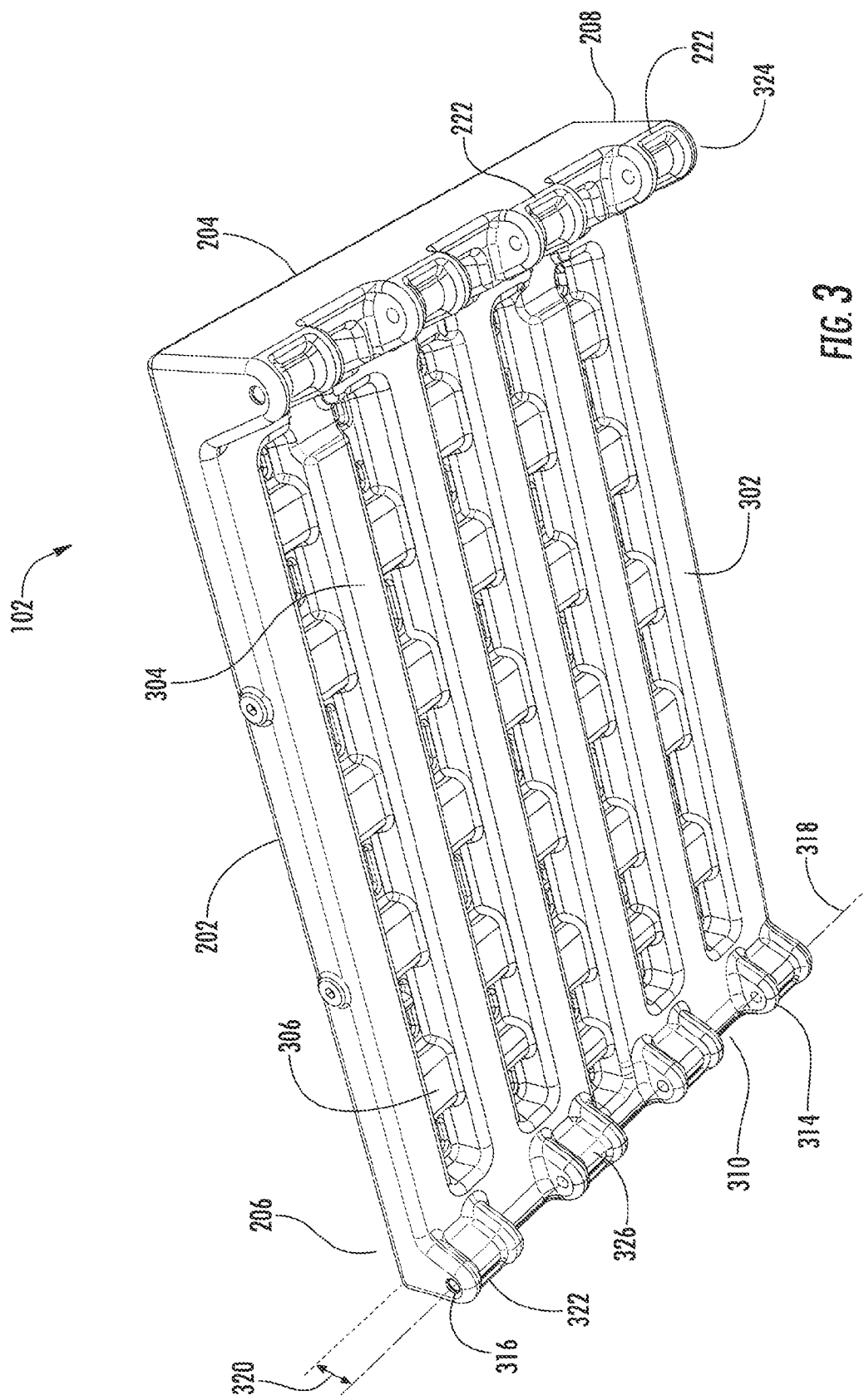
FIG. 3 is a bottom perspective view of an upper tread of the apparatus of FIG. 1.

As illustrated in FIGS. 2 and 3, the upper tread 102 includes a generally planar upper surface 202 and an opposite, generally planar lower surface 302, a first longitudinal end 204, and a second longitudinal end 206. First longitudinal end 204 includes an end wall 208 extending from upper surface 202 to a point beyond lower surface 302. The lower portion 212 of end wall 208 is formed with a number protrusions 214 (4 shown) separated by cutouts 210 (three shown). Other quantities and configurations (e.g., size, shape, or spacing) of protrusions 214 and cutouts 210 may be used.

A passage 216 is coaxially formed through each of the protrusions 214 so that the axis 218 of the passages is parallel, or substantially parallel, to the upper surface 202. The axis 218 is spaced perpendicular from the upper surface 202 a distance 220.

As illustrated in FIG. 3, the second longitudinal end 206 is formed with protrusions 314 (4 shown) separated by cutouts 310 (3 shown). Other quantities and configurations (e.g., size, shape, or spacing) of protrusions 314 and cutouts 310 may be used. In the embodiment illustrated, protrusions 314 are disposed on the lower surface 302, however, the protrusions 314 may also be disposed on a second end wall (not shown) similar to end wall 208. A passage 316 is coaxially formed through each of the protrusions 314 so that the axis 318 of the passages is parallel, or substantially parallel, to the upper surface 202. The axis 318 is spaced perpendicular from the upper surface 202 a distance 320 that is preferably less than distance 220. In a preferred embodiment, axes 218 and 318 are parallel.

FIG. 3 illustrates the lower surface 302 of upper tread 102 with a pattern of reinforcing elements, for example longitudinal reinforcement elements 304 and transverse reinforcing elements 306. The reinforcing elements are shown in a longitudinal and transverse pattern for ease of illustration only. Any pattern of reinforcing elements may be used to provide adequate mechanical characteristics to the upper tread 102.

Figure 4:
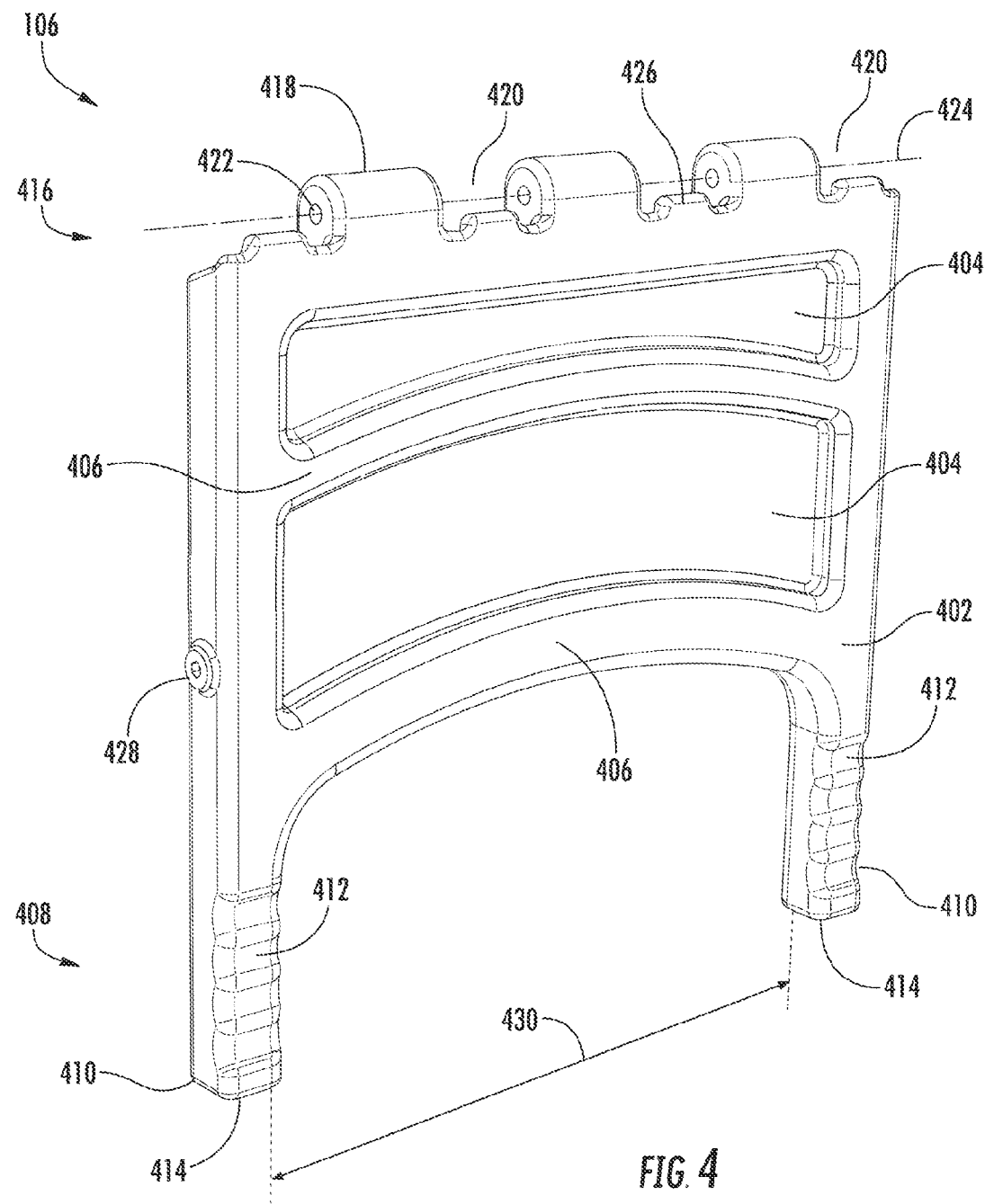
FIG. 4 is a perspective view from a first side of a first support of the apparatus of FIG. 1.
Figure 5:
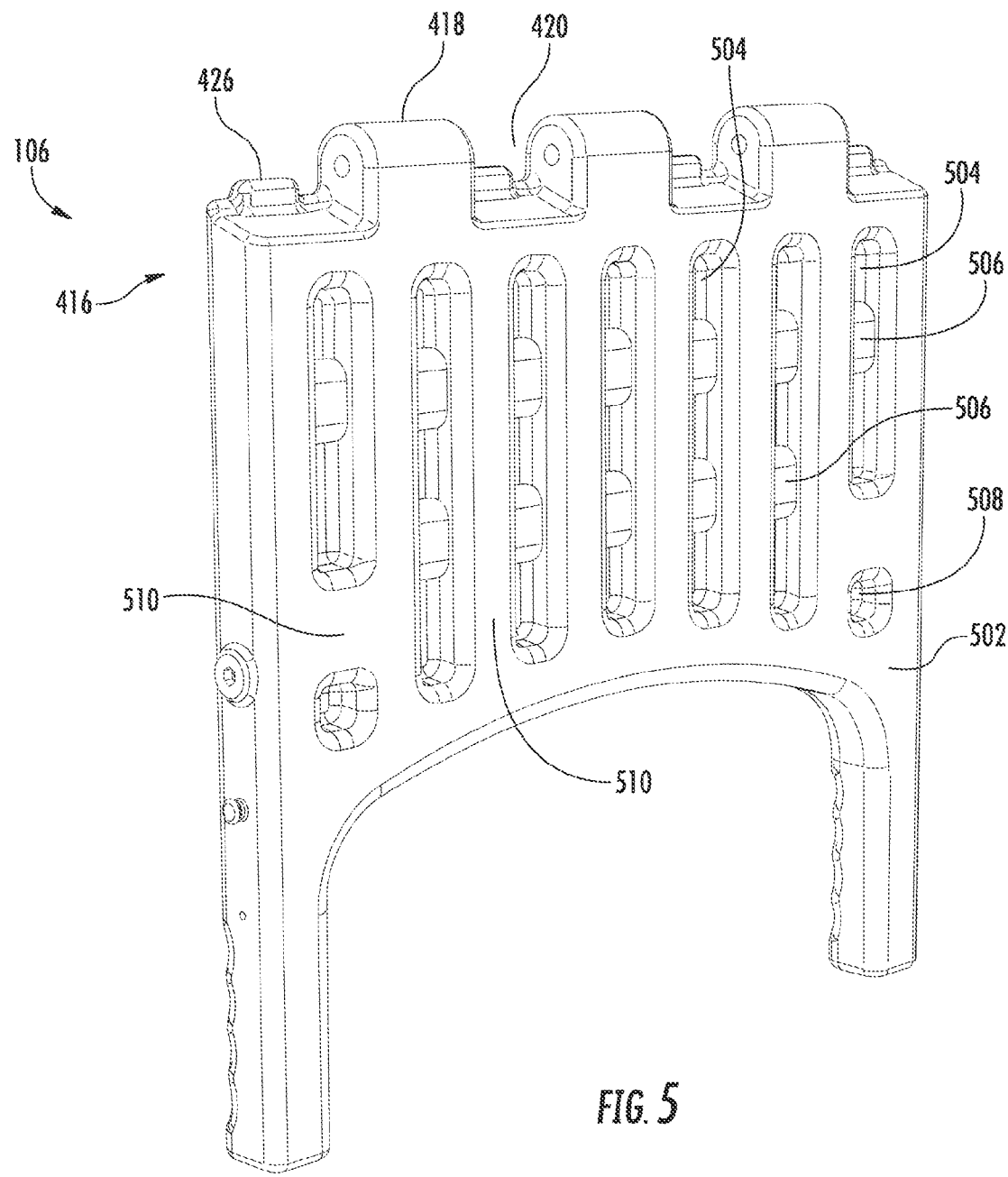
FIG. 5 is a perspective view from a second, opposite side of a first support of the apparatus of FIG. 1.

A non-limiting embodiment of a first support 106 is illustrated in FIGS. 4 and 5. FIG. 4 illustrates the outward facing first surface 402 of first support 106 formed with a pattern of depressions or recesses 404 (2 shown) surrounded by a raised portion 406. The configuration of recesses 404 and the raised portion 406 may be chosen to provide mechanical strength to the first support at a reduced weight.

The lower portion 408 of first support 106 is formed with legs 410. The first surface 402 of a portion of the legs 410 is formed with a pattern 412 to facilitate gripping as will be more fully discussed below. The lower end portions 414 of legs 410 may be configured to resist slipping when placed on a support surface. The slip resistant surface may be formed into the legs or may include an added element, such as a pad, with an enhanced coefficient of friction. The lower portions of the legs 410, for example the portion of the legs with pattern 412, have an inside spacing 430 between oppositely facing portions of the legs 410.

Upper end portion 416 of first support 106 is formed with protrusions 418 and cutouts 420 corresponding with the cutouts 210 and protrusions 214 of the first end 204 of upper tread 102. A passage 422 is coaxially formed through each of the protrusions 418 about axis 424 so that, when protrusions 418 are interdigitated with protrusions 214, axis 422 is collinear with axis 218 and passages 422 align with passages 216 to accept a pivot pin or rod (not shown) to form first joint 112 (FIG. 1) with an axis of rotation coaxial with axes 216 and 416.

As illustrated in FIG. 4, the upper portion 416 of first support 106 may include features to control rotation of the first joint 112. For example, projections 426 may be formed in a portion of the cutouts 420 to engage a portion of upper tread 102, for example edge 222, to limit rotation about the first joint 112. For example, when first support 106 is pivotably connected to upper tread 102 in a position as illustrated in FIG. 1, projection 426 allows rotation of first support 106 about joint 112 in a first direction 114 and hinders, or prevents, rotation in a second direction 116 by abutting edge 222. Projections 426 may be configured to fit within recesses 324 formed in protrusions 214 to facilitate guidance of the first support 106 and the upper tread 102 during rotation about the first joint 112. The cooperation of projections 426 and recesses 324 may facilitate static alignment of the first support 106 and the upper tread 102.

Alternately, or in addition to projections 426, brackets, such as bracket pair 118a, 118b in FIG. 1, may be used to limit or prevent rotation in second direction 116. The brackets 118a, 118b individually or in pairs, can be selectively locked to prevent rotation of the first support 106 in first direction 114 about first joint 112. Anchor points 224 (FIG. 2) and 428 (FIG. 4) may be provided to pivotably connect brackets 118a, 118b at one end to the upper tread 102 and at a second end to first support 106, respectively.

FIG. 5 illustrates the inward facing second surface 502 of first support 106 formed with a pattern of linear depressions or recesses 504 with perpendicular reinforcing elements 506 formed therein. In forming the recesses 504, the portions 510 of the surface 502 surrounding the recesses 504 may be considered raised ribs and enhance the mechanical characteristics of the support 106. The pattern illustrated is illustrative only as other patterns may be used with similar results of mechanical strength at a reduced weight. As illustrated, some recesses, e.g., 508, do not have perpendicular reinforcing elements.

In some embodiments, the first support 106 may have sufficient mechanical properties and an appropriate weight with reinforcing elements and recesses formed only at the first surface 402, only at the second surface 502, or not formed at either the first surface 402 or the second surface 502.

Figure 6:
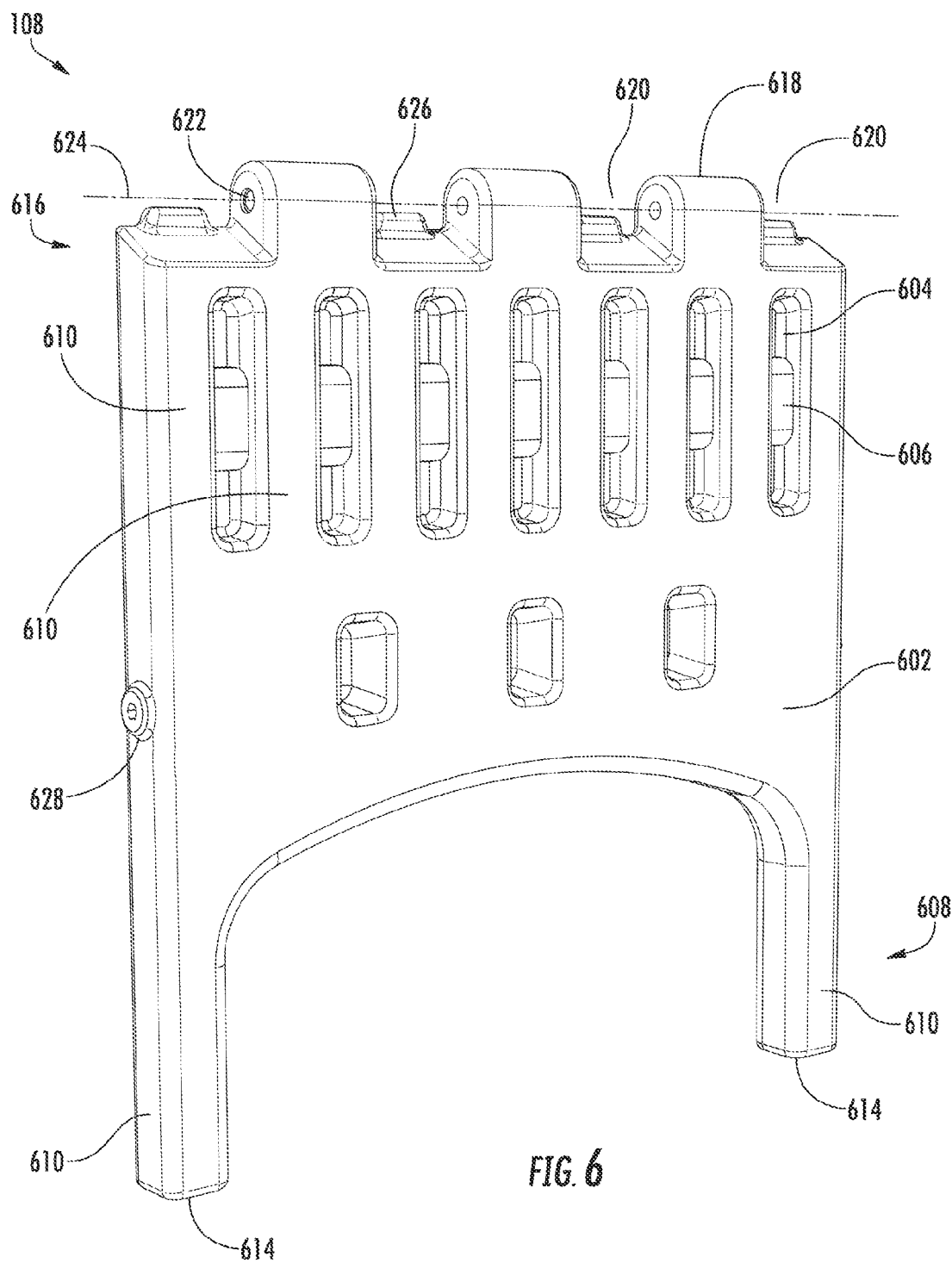
FIG. 6 is a perspective view of a second surface of the second support of the apparatus of FIG. 1.
Figure 7:
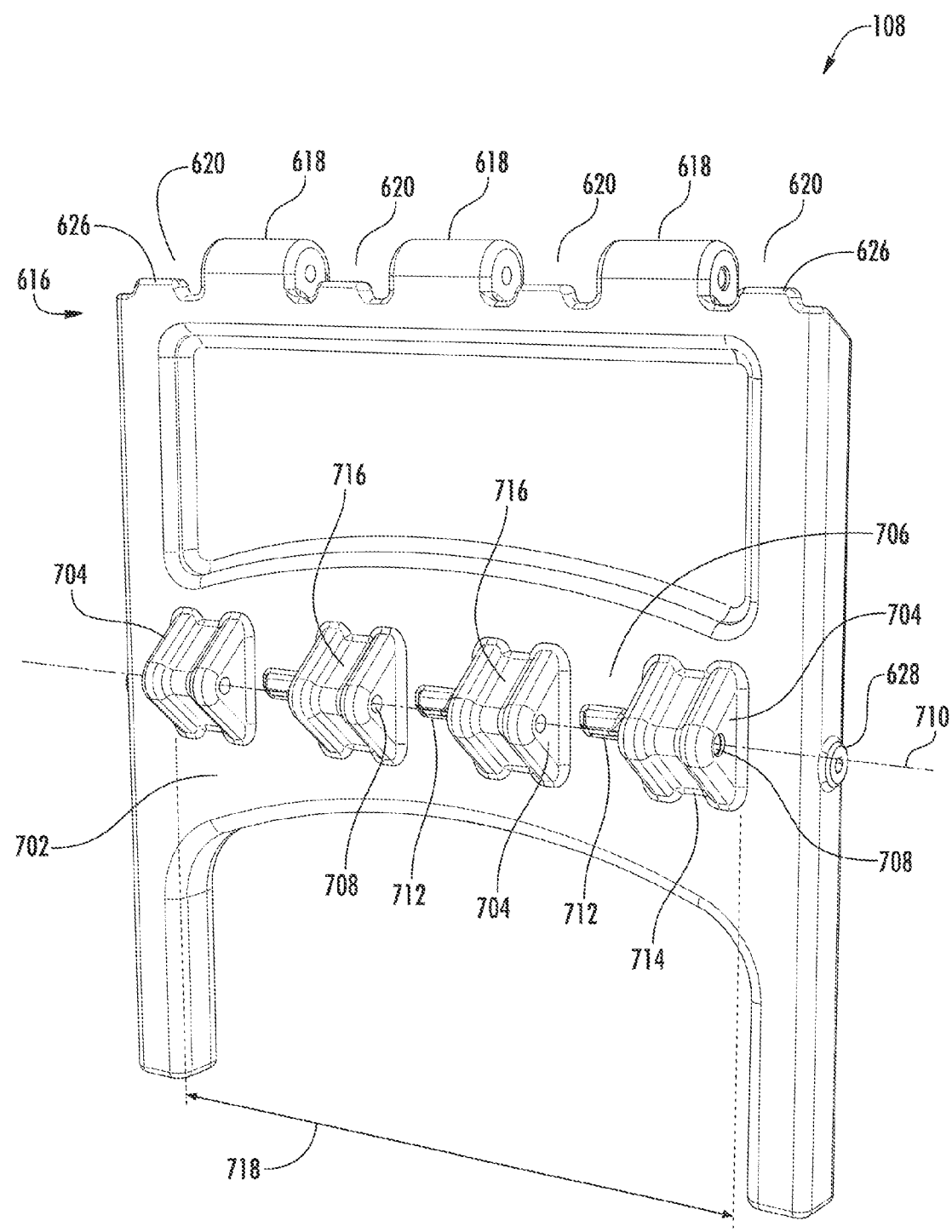
FIG. 7 is a perspective view of a first surface of the second support of the apparatus of FIG. 1.

A non-limiting embodiment of a second support 108 is illustrated in FIGS. 6 and 7. FIG. 6 illustrates the inward facing second surface 602 of second support 108 formed with a pattern of linear depressions or recesses 604 with perpendicular reinforcing elements 606 formed therein, similar in construction to the second, inward facing surface 502 of first support 106. As discussed above with reference to FIG. 5, the recesses 604 and portions 610 are formed to provide mechanical strength at a reduced weight and may have a configuration different from that illustrated at second surface 602 in FIG. 6, or may be absent from second surface 602.

The lower portion 608 of second support 108 is formed with legs 610. The lower end portions 614 of legs 610 may be configured to resist slipping when placed on a support surface in the same manner as discussed above with reference to first support 106 and FIG. 4.

The upper end portion 616 of second support 108 is formed with protrusions 618 and cutouts 620 corresponding with the cutouts 310 and protrusions 314 of the second end 206 of upper tread 102. A passage 622 is coaxially formed through each of the protrusions 618 about axis 624 so that, when protrusions 618 and protrusions 314 are interdigitated, axis 622 is collinear with axis 318 and passages 622 align with passages 316 to receive a pivot or pin (not shown) to form second joint 120 (FIG. 1) with an axis of rotation coaxial with axes 318 and 624. The pivoting connection between second support 108 and upper tread 102 at second joint 120 is similar in construction and function to the connection between first support 106 and upper tread 102 at first hinge 112.

Similar to the upper portion 419 of first support 106, the upper portion 616 of second support 108 may be formed with features, such as projections 626, to limit the rotation of second joint 120 and guide the second support 108 and upper tread 102 during rotation about the second joint 120. The projections 626 can engage a portion of the upper tread 102, for example edge 322, to limit rotation about the second joint 120. For example, when second support 108 is pivotably connected to upper tread 102 in the position as illustrated in FIG. 1, projection 626 allows rotation of second support 108 about joint 120 in a second direction 116 and hinders, or prevents, rotation in a first direction 114 by abutting edge 322 of upper tread 102 (FIG. 3). Projections 626 may be configured to fit within recesses 326 formed in protrusions 314 to guide the second support 108 and upper tread 102 during rotation about the second joint 120.

Alternately, or in addition to projections 626, brackets, such as bracket pair 121a, 121b in FIG. 1, may be used to limit or prevent rotation in first direction 114. The brackets 121a, 121b individually or in pairs, can be selectively locked to prevent rotation of the second support 108 in second direction 116. Anchor points 226 (FIG. 2) and 426 (FIG. 4) may be provided to pivotably connect one end of brackets 121a, 121b to the upper tread 102 and a second end to second support 108, respectively.

FIG. 7 illustrates the outward facing first surface 702 of second support 108. One or more projections or bosses 704 (4 shown) are disposed on the first surface 702 separated from adjacent bosses 704 by spaces 706. A passage 708 is coaxially formed through each boss 704 along axis 710. In a preferred embodiment, the distance 718 between the outward facing surfaces of outermost bosses 704 does not exceed the inside spacing 430 between the legs 410 of the first support 106.

Figure 8:
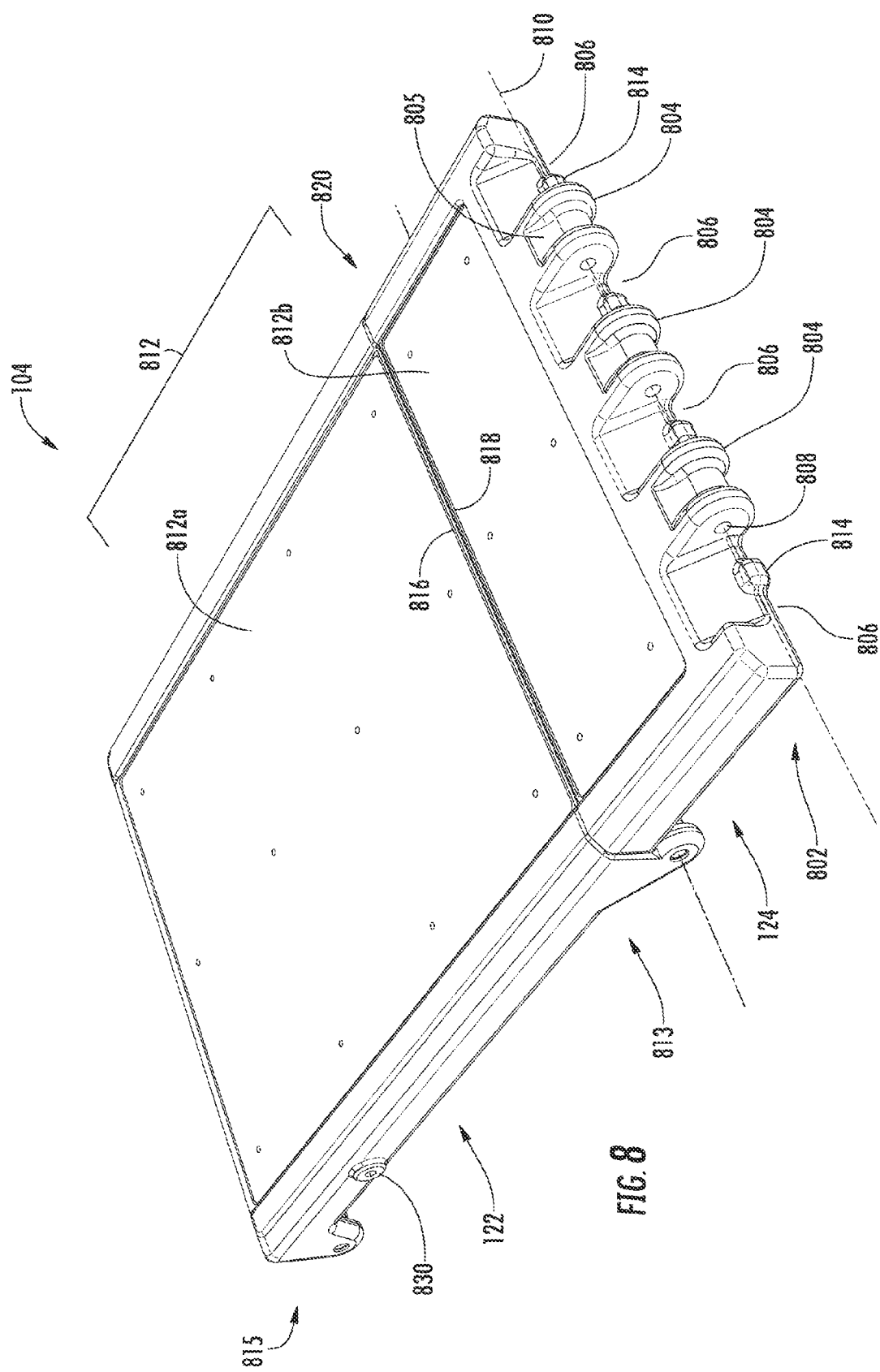
FIG. 8 is a top perspective view of the lower tread of the apparatus of FIG. 1.
Figure 9:
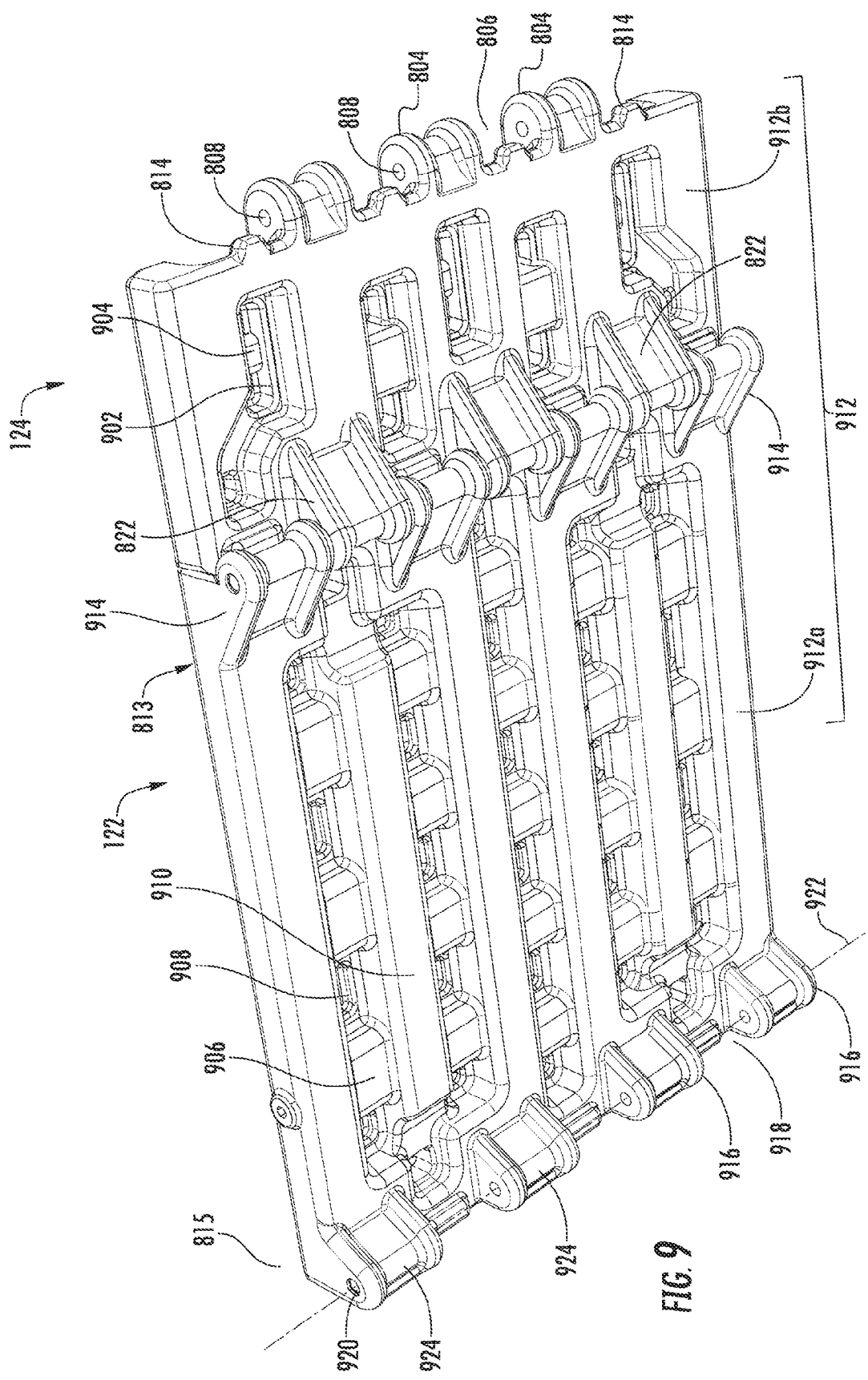
FIG. 9 is a bottom perspective view of the lower tread of the apparatus of FIG. 1.

FIG. 8 illustrates a non-limiting embodiment of lower tread 104, comprising first portion 122 having a first end 813 pivotably joined to second end 820 of second portion 124. First end 802 of second portion 124 is formed with protrusions 804 and cutouts 806. A passage 808 is coaxially formed through each protrusion 804 about axis 810 generally parallel to top surface 812b of the second portion 124. The axis 810 lies in a plane parallel to, and located between, the top surface 812b and the bottom surface 912b (FIG. 9). The number and configuration of the protrusions 804 and cutouts 806 correspond with the spaces 706 and bosses 704 of second support 108 so that, when protrusions 804 and bosses 704 are interdigitated, passages 808 and 710 are aligned to receive a pivot or pin (not shown) to form a third joint 126 with an axis of rotation collinear with axes 710 and 810.

As illustrated in FIG. 8, the first end 802 may include features to control rotation of the third joint 126. For example, projections 814 may be formed in a portion of the cutouts 806 to engage a portion of second support 108. For example the projection 814 may abut an edge 714 of the boss 704 to limit rotation of the third joint 126. For example, when the first portion 802 of lower tread 104 is pivotably connected to second support 108 in the position illustrated in FIG. 1, projections 814 and edge 714 allow rotation of second portion 124 about third joint 126 in a first direction 114, and hinder, or prevent, rotation in a second direction 116 by interfering with rotation of the second portion 124 in the second direction.

Features may be included to provide guidance for second support 108 and second portion 124 during rotation about third joint 126. For example, projections 814 may be slidingly received in recesses 716 formed in bosses 704 and engage the recesses 716 during rotation about third joint 126. Similarly, projections 712 may be slidingly received in recesses 805 formed in protrusions 804 and engage the recesses 805 during rotation about third joint 126. Projection/recess cooperating pairs 814/716 and 712/805 may also facilitate static alignment of the second portion 124 and second support 108.

Lower tread 104 as illustrated includes a generally planar top surface 812 comprising a top surface 812a of first portion 122 and a top surface 812b of second section 124. In a configuration of the foldable step apparatus 100 (e.g., as illustrated in FIG. 1) top surfaces 812a and 812b are generally coplanar and transverse edge 816 of first portion 122 and transverse edge 818 of second portion 124 are in an adjacent or abutting arrangement.

FIG. 9 illustrates a non-limiting embodiment of a bottom surface 912 of lower tread 104 comprising a bottom surface 912a opposite top surface 812a and a bottom surface 912b opposite top surface 812b. As illustrated, bottom surface 912b is formed with a pattern of recesses 902 and ribs 904 transverse to the recesses 902, similar to those described above. Bottom surface 912b, recesses 902, and ribs 904 cooperate to provide mechanical strength to the second portion 124 at a reduced weight. Similarly, bottom surface 912a is formed with a pattern of recesses 908, longitudinal ribs 910, and transverse ribs 904, similar to those described above. Bottom surface 912a, recesses 908, and ribs 906, 910 cooperate to provide mechanical strength to the first portion 122 at a reduced weight.

Figure 10:
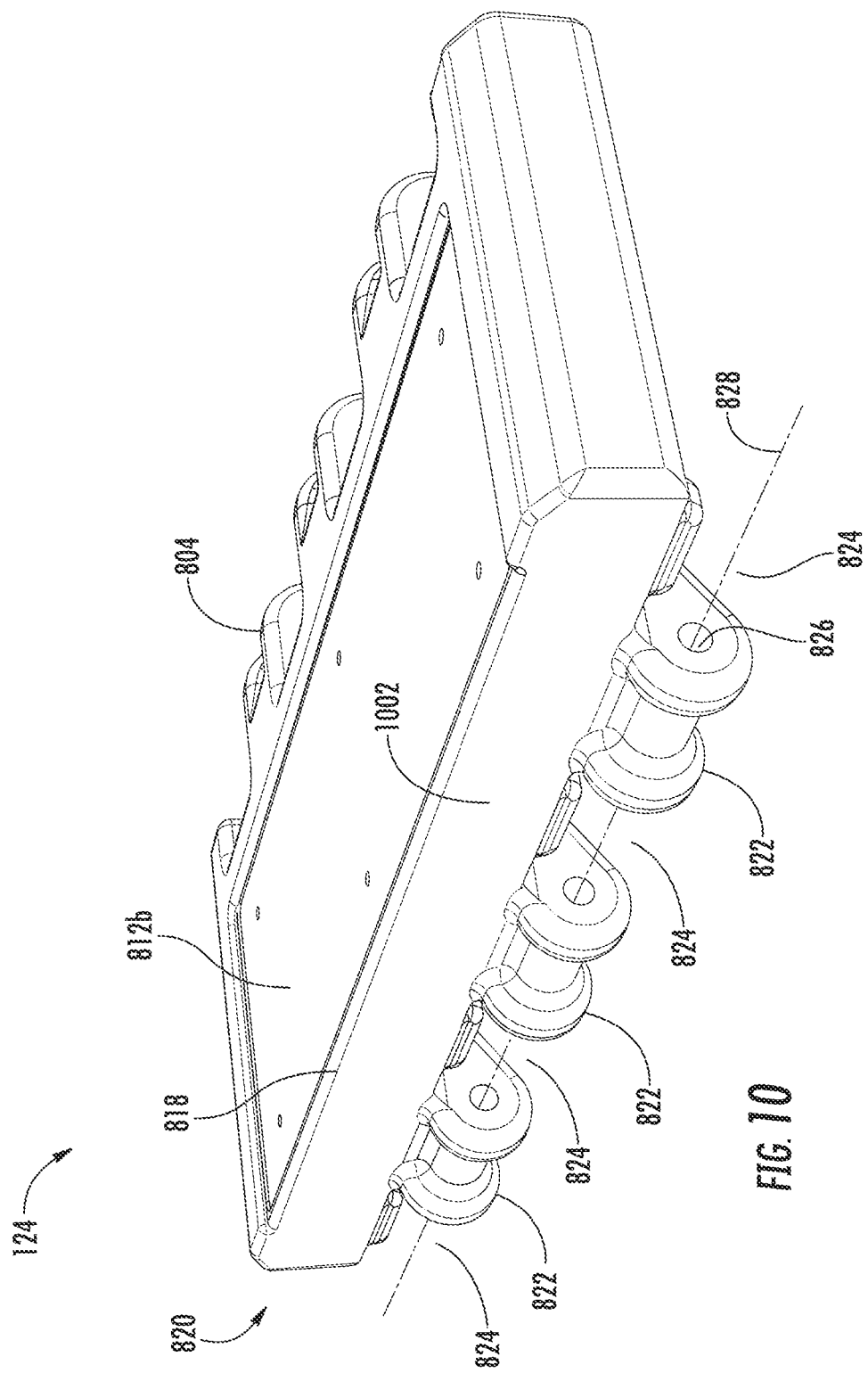
FIG. 10 is a top perspective view of a second portion of the lower tread of the apparatus of FIG. 1.

The second end 820 of second portion 124 is formed with projections 822 disposed on bottom surface 912b so that a portion of the projections 822 extends beyond end surface 1002 at second end 820. As illustrated in FIG. 10, projections 822 are spaced apart by cutouts 824. A passage 826 is coaxially formed along axis 828 through a portion of each projection 822 that is spaced from the bottom surface 912b and spaced from end surface 1002. Axis 828 is generally parallel to top surface 812b and axis 810 (FIG. 8). Axis 828 lies in a plane parallel to the top surface 812b and the bottom surface 912b (FIG. 9) and located offset from bottom surface 912b away from top surface 812b (i.e., below the bottom surface 912b as drawn).

Figure 11:
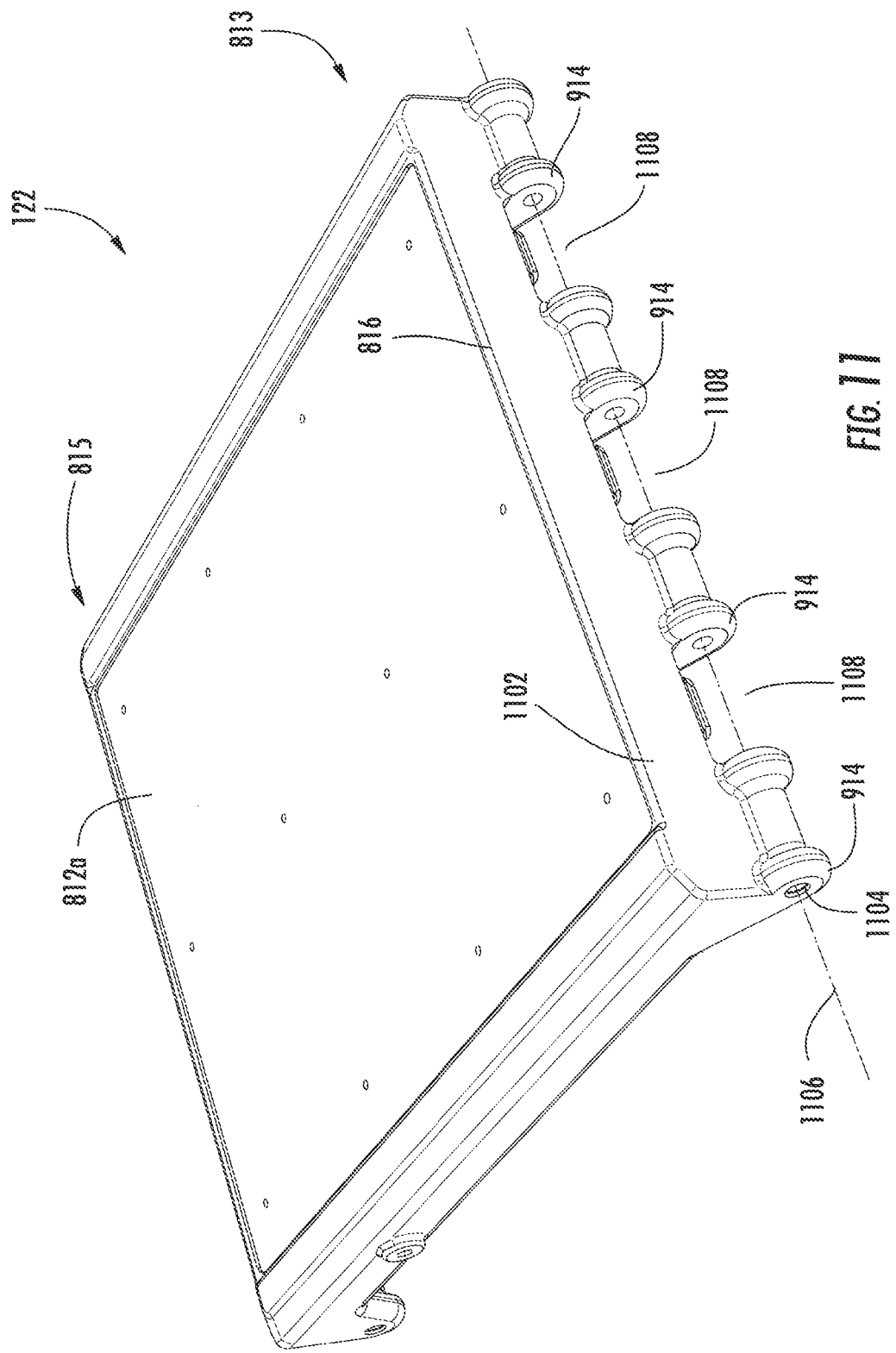
FIG. 11 is a top perspective view of a first portion of the lower tread of FIG. 1.

The first end 813 of first portion 122 is formed with projections 914 disposed on bottom surface 912a as shown in the non-limiting embodiment of FIG. 9. As may be seen from FIGS. 9 and 11, a portion of each projection 914 extends beyond the end surface 1102 (FIG. 11) that includes transverse edge 816. Projections 914 are spaced from each other by cutouts 1108. A passage 1104 is coaxially formed through this portion of each projection 914 along axis 1106. Axis 1106 is generally parallel to top surface 812a and the bottom surface 912a and lies in a plane parallel to the top and bottom surfaces 812a, 912a and offset from the bottom surface 912a away from the top surface 812a (i.e., below bottom surface 912 as drawn).

The number and configuration of the projections 914 and cutouts 1108 correspond with the cutouts 824 and projections 822 of second portion 124 so that, when projections 914 and projections 822 are interdigitated, axes 828 and 1106 are coaxial and passages 828 and 1106 are aligned to receive a pivot or pin (not shown) to form a fourth joint 128 (FIG. 1) with an axis of rotation coaxial with axes 828 and 1106.

Transverse edges 816 and 818 in an abutting arrangement as discussed above may also limit or prevent rotation of one of the first portion 122 or the second portion 124 with respect to the other about fourth joint 128 when the first and second portions 122, 124 are arranged as illustrated in FIG. 1.

Figure 12:
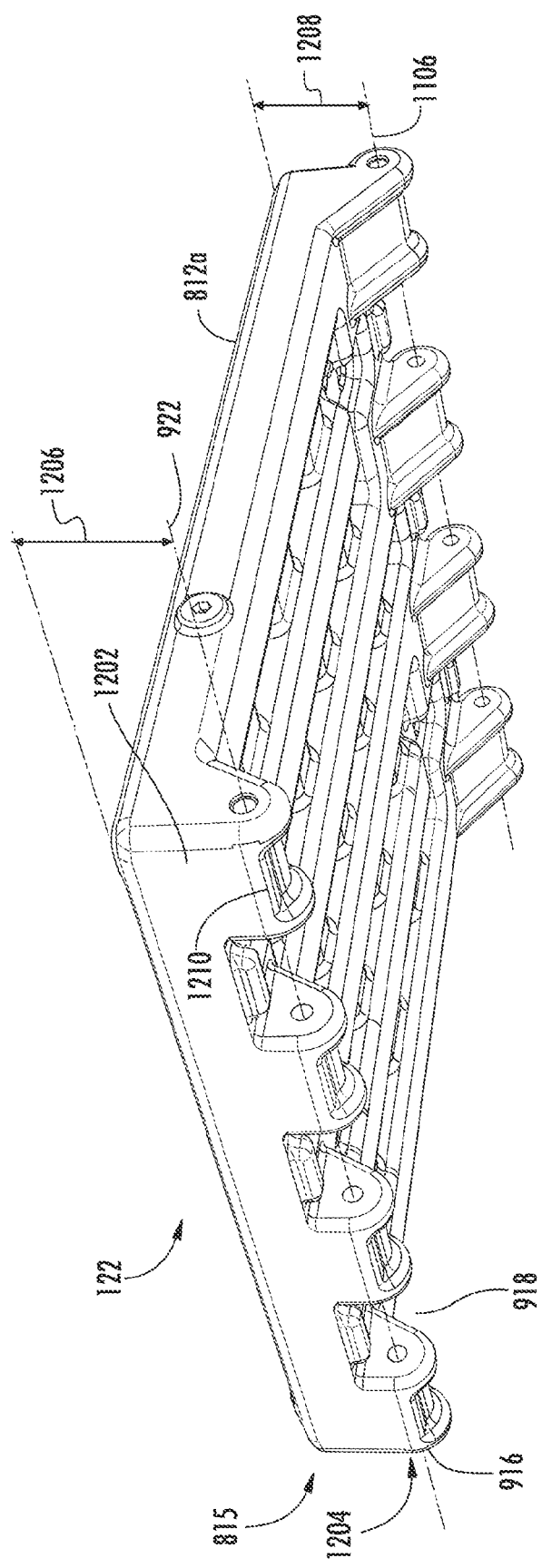
FIG. 12 is a bottom perspective view of the first portion of the lower tread of the apparatus of FIG. 1.

As illustrated in non-limiting embodiment of FIGS. 9 and 12, the second end 815 of first portion 122 includes an end wall 1202 extending from top surface 812a to a point beyond lower surface 912a. The lower portion 1204 of end wall 1202 is formed with a number protrusions 916 separated by cutouts 918. A passage 920 is coaxially formed through each of the protrusions 916 along axis 922. The axis 922 is parallel to top surface 812a and spaced perpendicular from the upper surface 912a a distance 1206. In a preferred embodiment, the distance 1206 that axis 922 is spaced from the upper surface 812a corresponds with the perpendicular distance 1208 between the upper surface 812a and the axis 1106.

Figure 13:
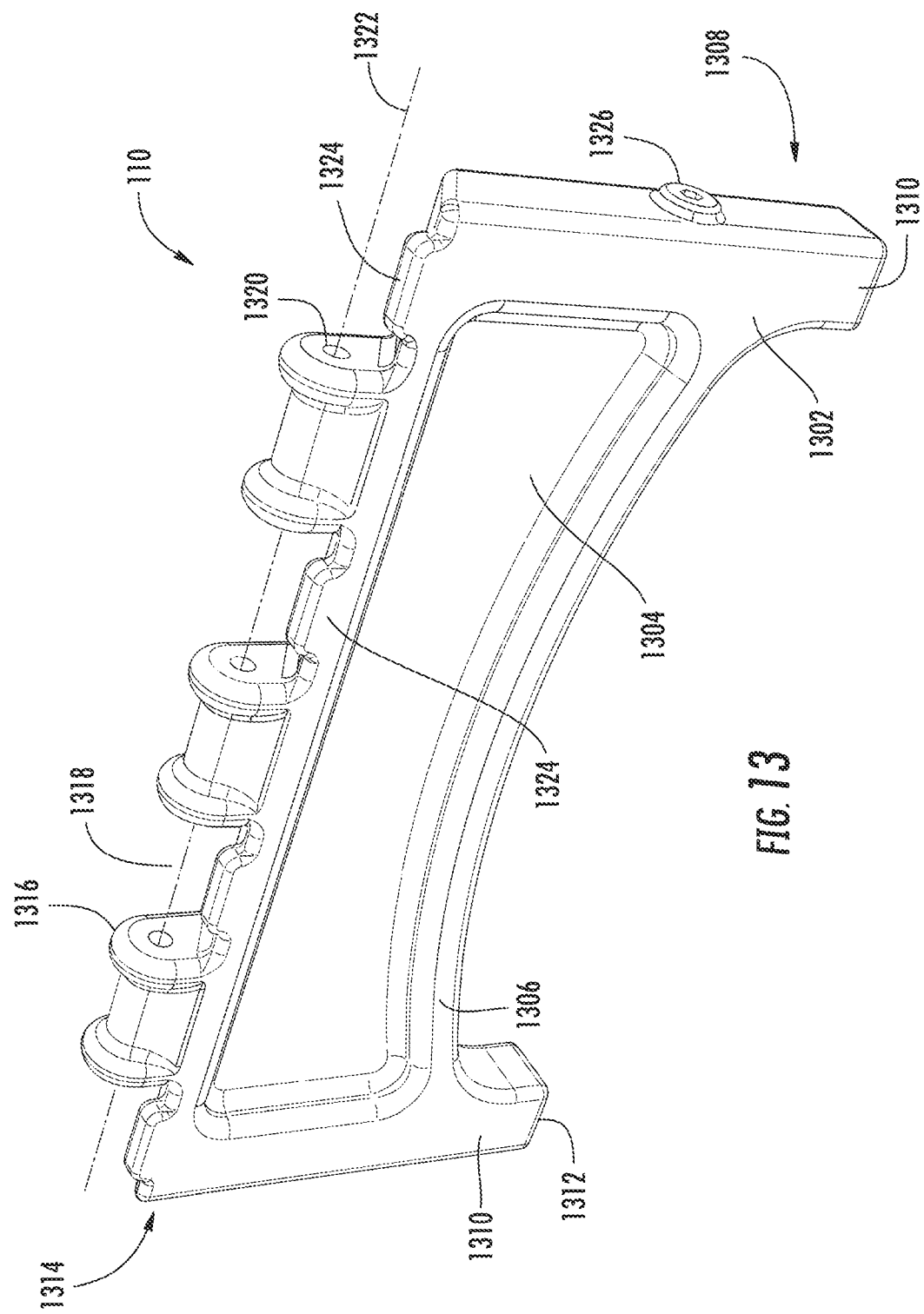
FIG. 13 is perspective view of the first surface of the third support of the apparatus of FIG. 1.
Figure 14:
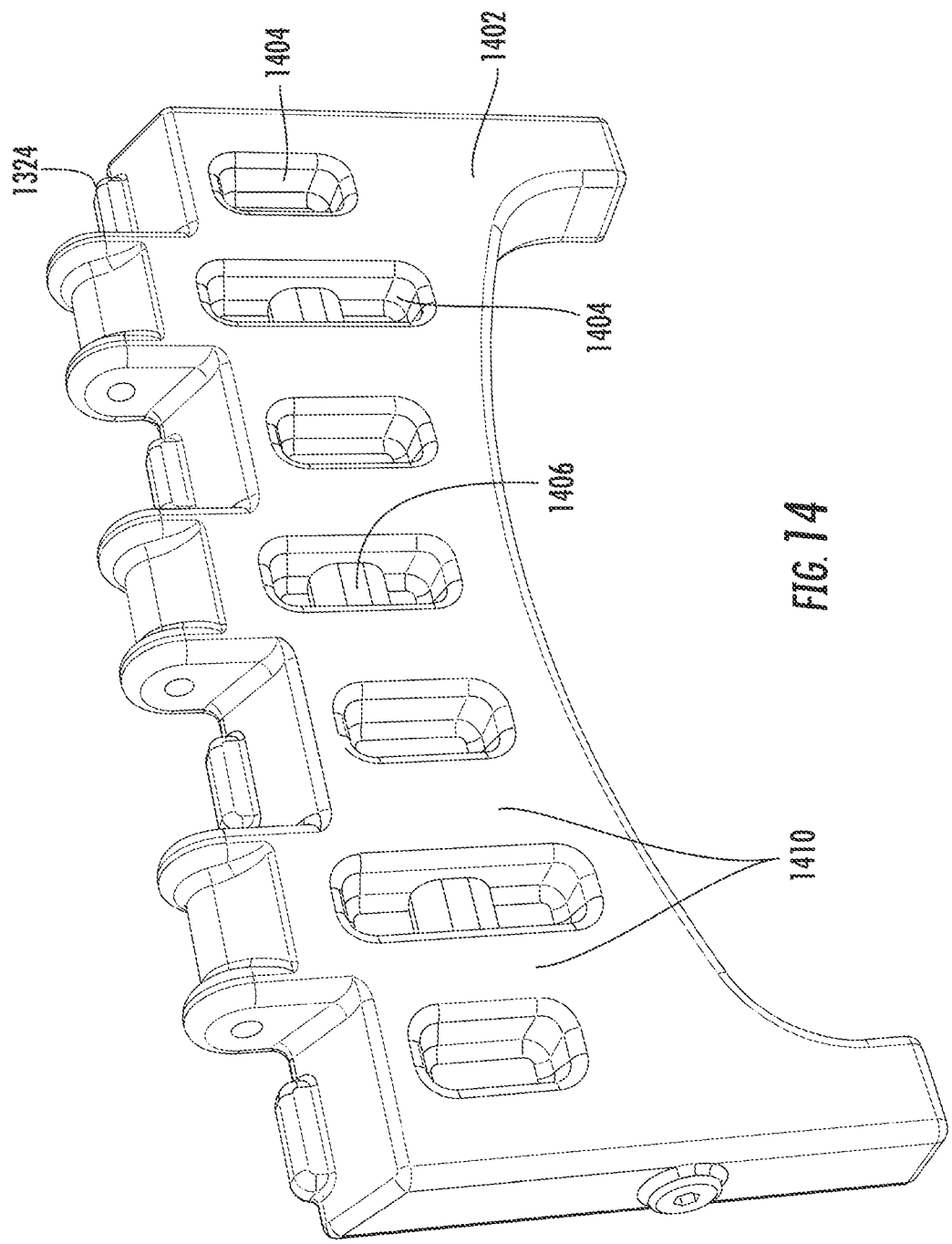
FIG. 14 is perspective view of the second surface of the third support of the apparatus of FIG. 1.

A non-limiting embodiment of a third support 110 is illustrated in FIGS. 13 and 14. FIG. 13 illustrates the outward facing first surface 1302 of third support 110 formed with a depression or recesses 1304 surrounded by a raised portion 1306. The configuration of recess 1304 and the raised portion 1306 may have other configurations and may be chosen to provide mechanical strength to the third support 110 at a reduced weight.

The lower portion 1308 of first support 106 is formed with legs 1310. The lower end portions 1312 of legs 1310 may be configured to resist slipping when placed on a support surface. The slip resistant surface may be formed into the legs or may include an added element, such as a pad, with an enhanced coefficient of friction.

Upper end portion 1314 of third support 110 is formed with protrusions 1316 and cutouts 1318 corresponding with the cutouts 1108 and protrusions 914 of the second end 815 of the first portion 122 of lower tread 104. A passage 1320 is coaxially formed through each of the protrusions 1316 about axis 1322 so that, when protrusions 1316 are interdigitated with protrusions 914, axis 1322 is collinear with axis 922 and passages 1320 align with passages 920. The aligned passages formed by 1320 and 920 are arranged to receive a pivot or pin (not shown) to form fifth joint 130 (FIG. 1) with an axis of rotation coaxial with axes 922 and 1322.

As illustrated in FIGS. 13 and 14, the upper portion 1314 of third support 110 may include features to control rotation of the fifth joint 130. For example, projections 1324 may be formed in a portion of the cutouts 1318 to engage a portion of the first portion 122 of lower tread 104, for example edge 1210, to limit rotation of the third support 110 about the fifth joint 130. For example, when third support 110 is pivotably connected to lower tread 104 and perpendicular thereto as illustrated in FIG. 1, projection 1324 allows rotation of third support 110 about fifth joint 130 in a second direction 116 and hinders, or prevents, rotation in a first direction 114 by abutting edge 1210. Projections 1324 may be configured to fit within recesses 924 formed in protrusions 916 to facilitate guidance of the third support 110 and the lower tread 104 during rotation of the fifth joint 130. The cooperation of projections 1324 and recesses 924 may facilitate static alignment of the third support 110 and the lower tread 104.

Alternately, or in addition to projections 1324, brackets, such as bracket pair 132a, 132b in FIG. 1, may be used to limit or prevent rotation in first direction 114. The brackets 132a, 132b individually or in pairs, can be selectively locked to prevent rotation of the third support 110 in second direction 116. Anchor points 830 (FIG. 8) and 1326 (FIG. 13) may be provided to pivotably connect brackets 132a, 132b at one end to the lower tread 104 and at a second end to third support 110, respectively.

FIG. 14 illustrates the inward facing second surface 1402 of third support 110 formed with a pattern of linear depressions or recesses 1404 with perpendicular reinforcing elements 1406 formed in some of the recesses 1404. In forming the recesses 1404, the portions 1410 of the surface 1402 surrounding the recesses 1404 may be considered raised ribs and enhance the mechanical characteristics of the third support 110. The pattern shown in the figures is illustrative only, as other patterns may be used with similar results of mechanical strength at a reduced weight.

In some embodiments, the third support 110 may have sufficient mechanical properties and an appropriate weight with reinforcing elements and recesses formed at the first surface 1302 only, at the second surface 1402 only, or not formed at either the first surface 1302 or the second surface 1402.

A feature of the disclosed apparatus 100 is the compact folded size obtained due to the novel configuration of the components, for example the offset hinge points 112 and 120, and the lower tread 104 comprising a joint (fourth joint 128) transverse to, and at an intermediate point along, the longitudinal length. Constructed as disclosed, the elements (for example 102, 104, 108, 108, and 110) cooperate to fold the apparatus 100 into the configuration illustrated in FIG. 15, which may advantageously be more compact than known apparatuses of similar unfolded size.

Figure 15:
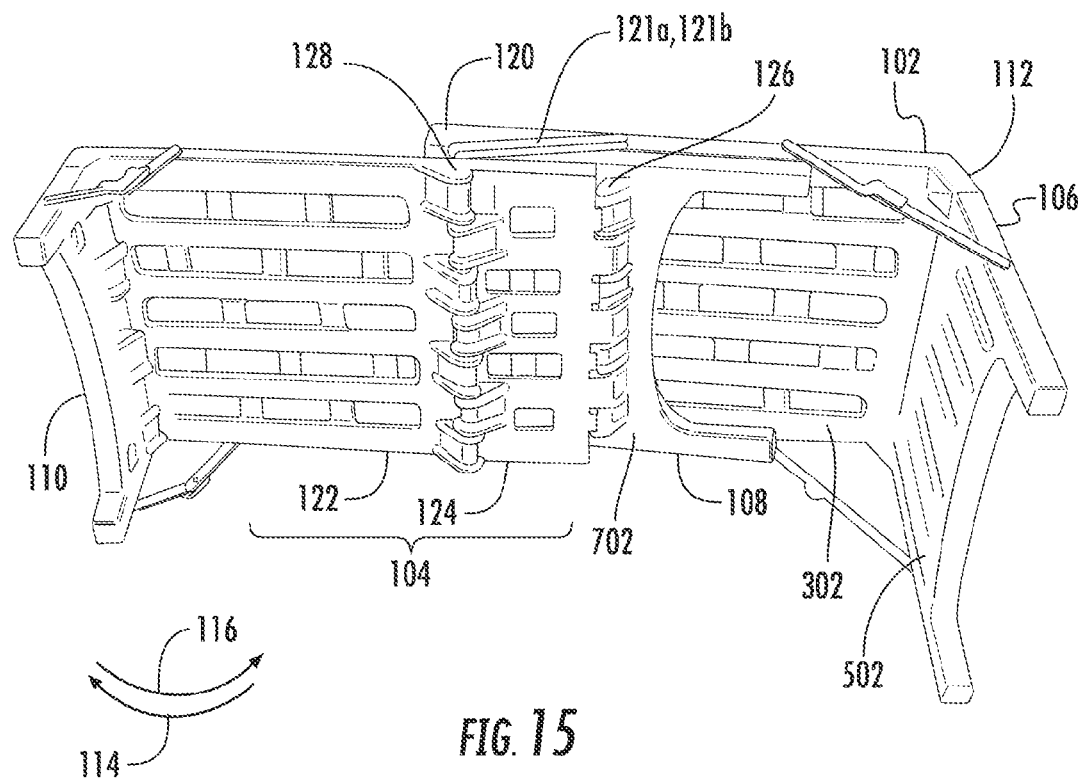
FIGS. 15-17 illustrate the apparatus of FIG. 1 in various folded configurations.

To achieve the compact size from the un-folded state of FIG. 1, the components of the apparatus are folded in accordance with FIGS. 15-18. Folding may be facilitated by placing the apparatus 100 on a side as shown in FIG. 15. In FIG. 15, the second support 108 is rotated in a second direction 116 with respect to upper tread 102 about second joint 120, which may include releasing brackets 121a, 121b, to place the second support 108 substantially parallel to the upper tread 102 and second surface 602 adjacent to lower surface 302. As the second support 108 rotates with respect to the upper tread 102, the lower tread 104 rotates with respect to the second support 108 at third joint 126 in a first direction 114 until the upper surface 812 of the lower tread 104 is substantially parallel to the second support 108 and the top surface 812 is adjacent to the outer facing first surface 702 of second support 108.

Figure 16:
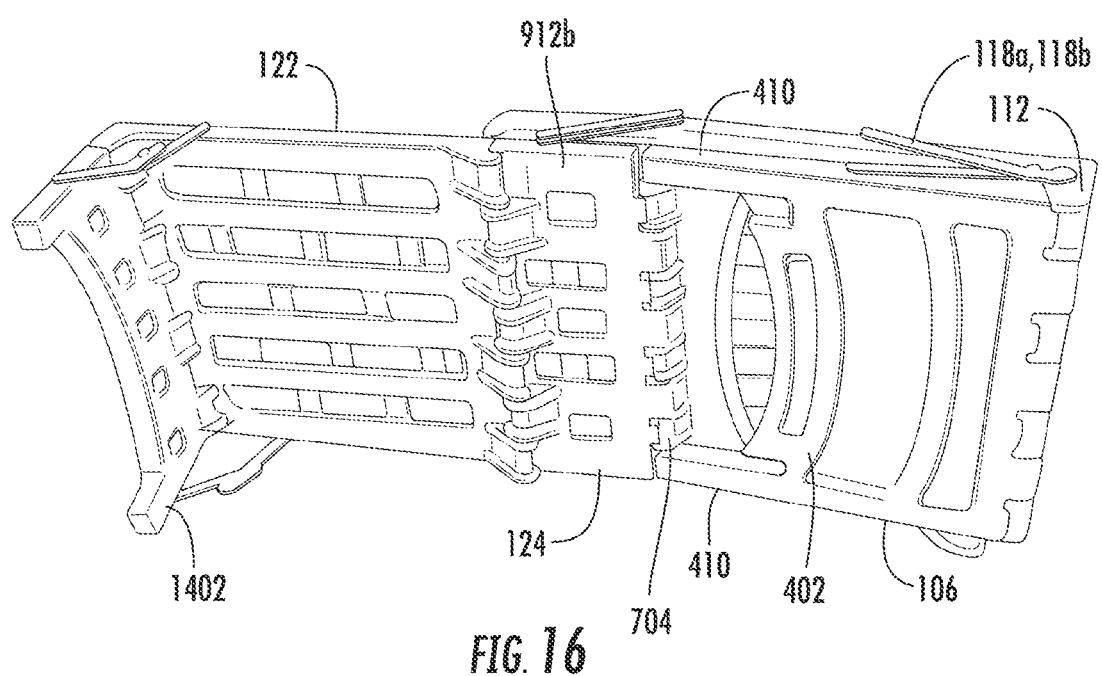

The first support 106 is then rotated in a first direction 114 with respect to the upper tread 102 about first joint 112 until the second, inward facing surface 502 of first support 106 is substantially parallel and adjacent to outer facing first surface 702 of second support 108 with handles 410 disposed outward of the bosses 704 as shown in FIG. 16. Rotating first support 106 may include releasing brackets 118a, 118b. The first surface 402 and the bottom surface 912b of second portion 124 of lower tread 104 are substantially parallel when the components are rotated as described.

Figure 17:
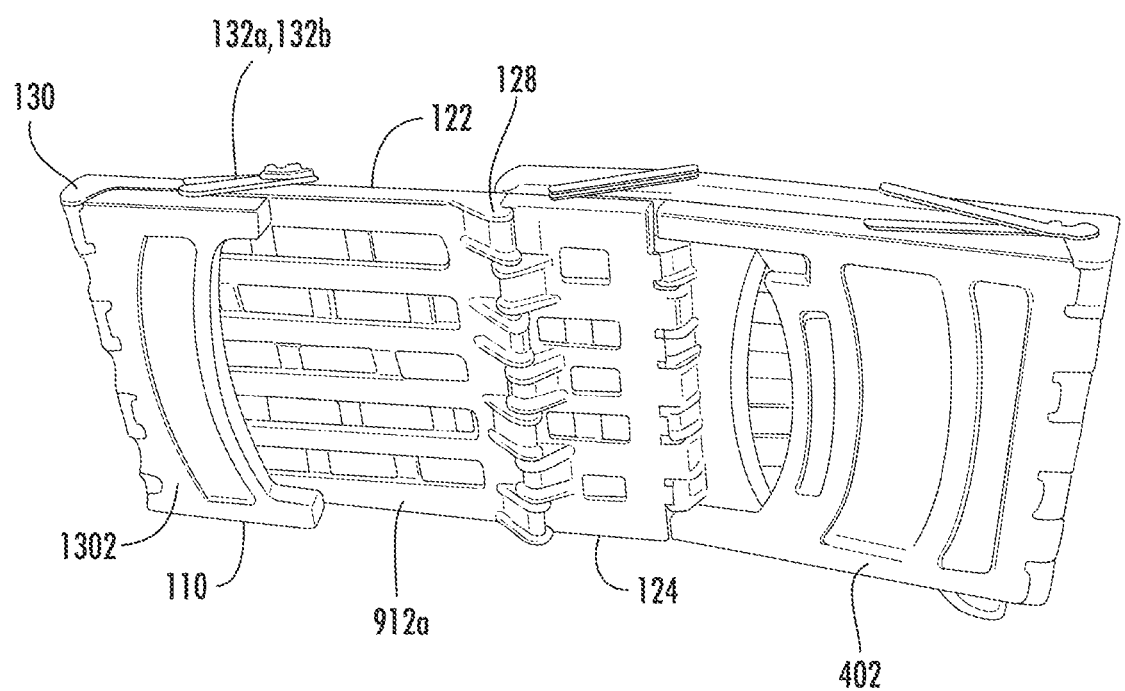

As illustrated in FIG. 17, the third support 110 is then rotated with respect to first portion 122 of the lower tread 104 about fifth joint 130 until inward facing surface 1402 of third support 110 is substantially parallel, and adjacent to, bottom surface 912a of first portion 122 of lower tread 104. Rotating third support 110 may include releasing brackets 132a, 132b.

Figure 18:
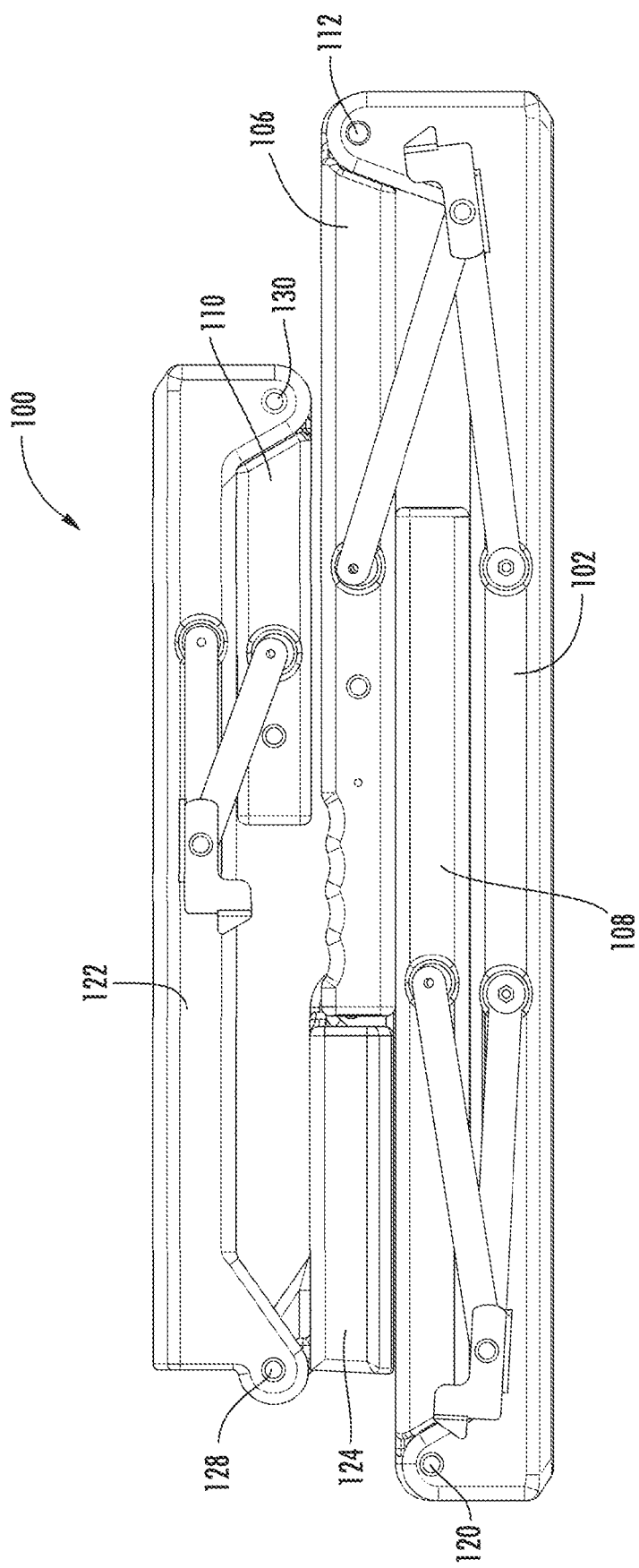
FIG. 18 is a side view of the apparatus of FIG. 1 in a folded configuration.

The first portion 122 of the lower tread 104 is then rotated in a second direction 116 with respect to the second portion 124 about third joint 128 until first surface 1302 of third support 110 is substantially parallel and adjacent to first surface 402 of first support 106 as shown in FIG. 18. The bottom surface 912a of first portion 122 is substantially parallel to, and spaced apart from, the bottom surface 912b of the second portion 124 and first surface 402 of at least the legs 410 of first support 106. The spaced apart relationship between the bottom surface 912b and the legs 410 provides access to the pattern 412 for grasping the folded apparatus 100 of FIG. 18.

The apparatus 100 may be maintained in the compact folded configuration of FIG. 15 by a latching device to prevent elements from separating from each other. For example, a latch may maintain third support 110 and first support 106 in an adjacent position, thus preventing the remaining elements from separating.

Thus a foldable step device is provided herein. The inventive device may advantageously provide a compact, foldable step to assist a pet in moving from one level to an elevated level without assistance.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A foldable step apparatus, comprising:
   an upper tread with a first end and a second end, a first support that supports the upper tread, the first support is pivotably joined to the first end at a first joint that allows pivoting movement of the first support from a first support position in a first direction toward the second end to a first folded position, and a second support that supports the upper tread, the second support is pivotably joined to the second end at a second joint that allows pivoting movement of the second support from a second support position in a second direction toward the first end to a second folded position; and
   a lower tread having a third end and a fourth end, the third end pivotably joined to the second support at a third joint to support the lower tread, and a third support that supports the lower tread, the third support pivotably joined to the fourth end at a fourth joint, wherein the lower tread comprises a first portion and a second portion pivotably joined at a fifth joint between the third end and the fourth end, the first portion and the second portion being coplanar with one another in a use position to form a generally planar top surface of the lower tread, and being foldable about the fifth joint to a third folded stowed position such that bottom surfaces of the first portion and the second portion are adjacent to and face one another, and in a stowed position of the foldable step apparatus, the second support is folded about the second joint in the second direction toward the first end, the second portion of the lower tread is folded such that a top surface of the second portion is parallel to and abutting the second support, the first support is folded about the first joint in the first direction toward the second end, the third support is folded about the fourth joint such that the third support is parallel to and abutting the bottom surface of the first portion of the lower tread, and the top surface of the second portion is parallel to and abutting the second support, and the first portion is folded about the fifth joint.

2. The apparatus of claim 1, wherein at least one of the upper tread, the lower tread, the first support, the second support, and the third support are plastic parts.

3. The apparatus of claim 2, wherein at least one of the plastic parts are formed in a blow molding operation.

4. The apparatus of claim 1, wherein the fifth joint provides rotation of the first portion with respect to the second portion between the use position and the stowed position so that an angular measure between a top surface of the portion and a top surface of the portion increases between the use first position and the stowed cccond position.

5. The apparatus of claim 1, wherein the first joint, the second joint, the third joint, and the fourth joint each have a respective rotation axis, and the apparatus further comprising a rotation limiter for limiting a rotation of each of the first joint, the second joint, the third joint, and the fourth joint about each respective rotation axis to about 90 degrees.

6. The apparatus of claim 1, wherein an axis of rotation for the first joint and an axis of rotation for the second joint are mutually parallel and parallel to an upper surface of the upper tread and disposed at a lower surface of the upper tread opposite to the upper surface.

7. The apparatus of claim 1, wherein an axis of rotation for the third joint, an axis of rotation for the fourth joint, and an axis of rotation for the fifth joint are mutually parallel and parallel to a top surface of the lower tread and spaced from the top surface of the lower tread in a direction of a bottom surface of the lower tread.

8. The apparatus of claim 7, wherein the axis of rotation for the third joint is spaced from the top surface a third distance, the axis of rotation for the fourth joint is spaced from the top surface a fourth distance, and the axis of rotation for the fifth joint is spaced from the top surface a fifth distance.

9. The apparatus of claim 8, wherein the fourth distance and the fifth distance are the same, and are each greater than the third distance.

10. A foldable step apparatus, comprising:
    an upper tread with a first end and a second end, a first support pivotably joined to the first end at a first joint and a second support pivotably joined to the second end at a second joint; and
    a lower tread having a third end and a fourth end, the third end pivotably joined to the second support at a third joint and a third support pivotably joined to the fourth end at a fourth joint,
wherein the lower tread comprises a first portion and a second portion pivotably joined at a fifth joint between the third end and the fourth end, the first portion and the second portion being coplanar with one another in a use position to form a generally planar top surface of the lower tread, and being foldable about the fifth joint to a stowed position such that bottom surfaces of the first portion and the second portion are adjacent to and face one another, and the lower tread forms a lowermost tread of the apparatus, wherein an axis of rotation for the first joint and an axis of rotation for the second joint are mutually parallel and parallel to an upper surface of the upper tread and disposed at a lower surface of the upper tread opposite to the upper surface, and the axis of rotation for the first joint is spaced from the upper surface a first distance, and the axis of rotation for the second joint is spaced from the upper surface a second distance less than the first distance.

* * * * *

UNITED STATES PATENT AND TRADEMARK OFFICE
CERTIFICATE OF CORRECTION

PATENT NO. : 9,832,968 B2
APPLICATION NO. : 14/636760
DATED : December 5, 2017
INVENTOR(S) : Jakubowski et al.

Page 1 of 1

It is certified that error appears in the above-identified patent and that said Letters Patent is hereby corrected as shown below:

In Claim 4, at Column 10, Line 26, delete "the portion and a top surface of the portion" and insert therefor -- the first portion and a top surface of the second portion --.

In Claim 4, at Column 10, Line 27, delete "use first position and the stowed cccond" and insert therefor -- use position and the stowed --.

Signed and Sealed this
Eighth Day of May, 2018

Andrei Iancu
*Director of the United States Patent and Trademark Office*